Oct. 30, 1934.  A. H. JOHNSON  1,978,581
ALTERNATING CURRENT MOTOR
Filed June 7, 1932

INVENTOR:
Arthur Howard Johnson,
by J R Goldsborough
HIS ATTORNEY.

Patented Oct. 30, 1934

1,978,581

UNITED STATES PATENT OFFICE 1,978,581

ALTERNATING CURRENT MOTOR

Arthur Howard Johnson, Upper Holloway, London, England, assignor to Electric and Musical Industries Limited, Middlesex, England, a company of Great Britain Application June 7, 1932, Serial No. 615,814
In Great Britain June 10, 1931

4 Claims. (Cl. 172—233)

The present invention relates to alternating current motors and more particularly to alternating current motors of the induction disc type.

An induction disc motor in common with other small alternating current motors, such, for example, as are used for driving talking machine turntables, has a poor efficiency particularly when used at voltage other than that for which the motor is designed. This has the effect of limiting the range of voltage over which a given motor will function satisfactorily, in that, at the lower voltages the torque developed is insufficient and at higher voltages overheating of the winding occurs. In addition the torque developed at higher voltages is very great and tends to cause the centrifugal governor to become "crazy" or erratic in operation owing to the excessive power it is called upon to control.

In the past a large and expensive series resistance has been introduced when operating from higher voltages but owing to the low power factor of the motor and its high current consumption, a considerable amount of heat has to be dissipated in this resistance and it becomes a difficult problem to find a suitable position for it.

It is an object of the present invention to provide means whereby an alternating current motor may be arranged to operate satisfactorily over a wide range of supply voltages.

According to the present invention, in association with an alternating current motor, there is provided a tapped or otherwise variable condenser arranged in series with the windings of the motor, whereby a predetermined operating voltage may be maintained across the motor over a range of different supply voltages.

The usual known type of induction disc motor comprises an induction disc co-operating with one or more driving elements, each comprising two core members carrying windings which are traversed by currents differing in phase. One core member is of substantially E shape and carries on its centre limb a single winding having high inductance, known as the reactive winding. The other core member is of U shape, the two limbs thereof being provided with windings connected in series. These windings are commonly known as the non-reactive windings. The two core members are usually arranged on opposite sides of the disc to be driven.

Figure 1:
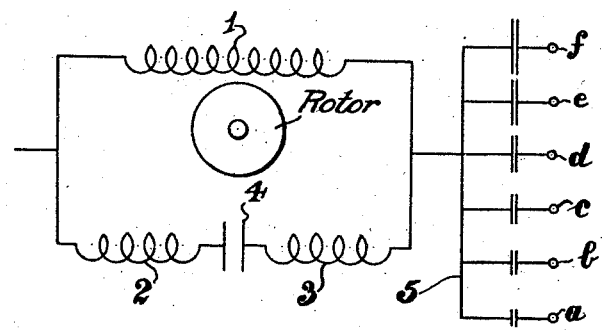
Figure 2:
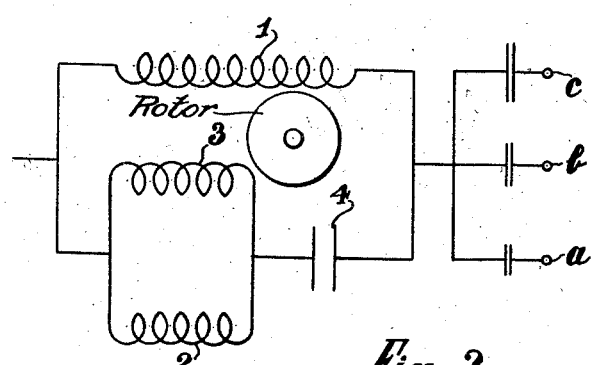

In the accompanying drawing in which the windings only of the motor are illustrated, Fig. 1 shows diagrammatically one embodiment of the invention in which the "non-reactive" windings are arranged in series and Fig. 2 shows a further embodiment in which the "non-reactive" windings are arranged in parallel.

Referring to Fig. 1, the reactive winding 1 is connected in parallel with the "non-reactive" windings 2, 3. In series with the non-reactive windings 2, 3 there is arranged a phase splitting condenser 4 which is of such a value that the reactance of these windings is substantially neutralized.

In series with the windings 1, 2, 3 there is provided, in accordance with the invention, a tapped condenser 5. Six tappings $a, b, c, d, e, f$ are provided on the condenser 5, the values of capacity reactance given by these tappings being such that, by selecting a suitable tapping point for the particular supply voltage to be used, substantially the same operating voltage may be obtained across the windings 1, 2, 3 of the motor over the normal range of supply voltages. The normal range extends from 100–250 volts and the six tappings $a, b, c, d, e, f$ may, therefore, correspond to supply voltages of 100, 130, 150, 200, 230, 250 volts respectively.

For the purpose of this description the windings 1, 2, 3 of the induction disc motor may be regarded as an inductance in series with a resistance, and in accordance with the invention there is arranged in series with the inductance a variable condenser 5. Suppose, for example, that the motor requires 220 volts for normal operation, and that a supply of only 100 volts is available. Then the tapping on the condenser 5 is so arranged that the value of the capacity in the circuit is such that sufficient of the inductive reactance of the winding 1, together with the residual reactance of the windings 2, 3, is neutralized in order that a voltage of 220 volts may be maintained across the motor terminals. Alternatively, the tapping on the condenser 5 can be so chosen that the inductive reactance of the windings 1, 2, 3 is over neutralized. The circuit will then possess a certain amount of capacity reactance, and the voltage across the motor terminals will be 220 volts as before.

If, however, the supply voltage is greater than 100, say for example, it is 150 volts, the tapping on the condenser is so chosen that a smaller portion of the inductive reactance of the windings 1, 2, 3 is neutralized or, alternatively, this reactance is over neutralized to a greater extent than when operating on 100 volt supplies.

For use on very low supply voltages, the "non-reactive" windings 2 and 3 may be arranged in parallel as shown in Fig. 2 and the range of capacity reactance required will accordingly be less. In this case three tappings a, b, c on the condenser 5 will be found to give sufficient variation in capacity reactance to maintain substantially the same operating voltage across the motor windings over the range of supply voltages available in this case.

It will be clear that in cases where the load upon the motor varies from time to time, the operating voltage across the windings 1, 2, 3 may be varied correspondingly by changing the tapping on the condenser 5.

It is obvious that the arrangement herein described is not limited to induction disc motors but is applicable to all forms of alternating current motors having a relatively low power factor.

I claim:

1. An alternating current motor of the induction disc type wherein certain of the windings are connected in parallel and there is arranged in series with said windings of the motor and supply terminals therefor, a condenser tapped at a plurality of predetermined positions, whereby a predetermined operating voltage may be maintained across the motor over a range of different supply voltages.

2. In combination, a motor having inductive reactance windings, capacitive reactance means in series with one of said windings to neutralize the inductive reactance thereof, a source of electrical energy, separate capacitive reactance means serially disposed between said source and all of said windings, and means for adjusting the value of the capacitive reactance of said last named means to meet different operating conditions of said motor.

3. In an induction motor having parallel connected windings, means providing capacitive reactance in series with said windings, and means whereby said capacitive reactance may be adjusted to neutralize a desired portion of the inductive reactance of one of said windings.

4. An alternating current electric motor including in combination, an inductive winding and a second winding in parallel therewith, the reactance of which second winding is substantially neutralized, means providing capacitive reactance in series with said parallel connected windings, and means whereby said capacitive reactance may be adjusted to neutralize a desired portion of the inductive reactance of the first named winding.

ARTHUR HOWARD JOHNSON.